(12) United States Patent
Chao

(10) Patent No.: US 9,065,108 B2
(45) Date of Patent: Jun. 23, 2015

(54) BATTERY SHELL OF ELECTRONIC DEVICE AND MANUFACTURING METHOD THEREOF

(71) Applicant: Getac Technology Corporation, Taipei (TW)

(72) Inventor: Po-Tsun Chao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 173 days.

(21) Appl. No.: 13/656,638

(22) Filed: Oct. 19, 2012

(65) Prior Publication Data

US 2013/0171505 A1 Jul. 4, 2013

Related U.S. Application Data

(60) Provisional application No. 61/581,522, filed on Dec. 29, 2011.

(30) Foreign Application Priority Data

May 18, 2012 (CN) .......................... 2012 1 0155419

(51) Int. Cl.
*H01M 6/42* (2006.01)
*H01M 2/10* (2006.01)

(52) U.S. Cl.
CPC ........ *H01M 2/1061* (2013.01); *Y10T 29/49108* (2015.01); *H01M 2/1066* (2013.01)

(58) Field of Classification Search
None
See application file for complete search history.

(56) References Cited

U.S. PATENT DOCUMENTS

| 5,432,017 | A | * | 7/1995 | Hassemer et al. | 429/4 |
| 2002/0094475 | A1 | * | 7/2002 | Aoyama | 429/99 |
| 2003/0157403 | A1 | * | 8/2003 | Shelekhin et al. | 429/159 |
| 2006/0068281 | A1 | * | 3/2006 | Hiratsuka et al. | 429/185 |
| 2006/0176014 | A1 | * | 8/2006 | Moon | 320/112 |
| 2008/0124624 | A1 | * | 5/2008 | Lin | 429/163 |

FOREIGN PATENT DOCUMENTS

CN 101692486 A 4/2010

\* cited by examiner

*Primary Examiner* — Patrick Ryan
*Assistant Examiner* — Jose Colucci Rios

(57) ABSTRACT

A method for manufacturing a battery shell of an electronic device includes providing a first metal component, providing a plastic casing, joining the first metal component to the plastic casing together, providing a battery pack, the battery pack including a main body and a connection part, disposing the battery pack on the first metal component, and fixing the connection part on the plastic casing. The thickness of the first metal component is A, the thickness of the plastic casing is B. The thickness of said plastic casing satisfies 0.4 mm≤B≤0.8 mm, and the total thickness of the first metal component and the plastic casing satisfies 0.8 mm≤A+B≤1.6 mm. The connection part is disposed on a side of the main body.

18 Claims, 9 Drawing Sheets

BATTERY SHELL OF ELECTRONIC DEVICE AND MANUFACTURING METHOD THEREOF

BACKGROUND

1. Technical Field

The present disclosure relates to a battery shell of an electronic device and a manufacturing method thereof, and more particularly, to a battery shell of a thin electronic device and a manufacturing method thereof.

2. Related Art

With the rapid progress of manufacturing technology and consumer demand, manufacturer develops the design of laptop computer structure toward miniaturization. A battery module of a conventional laptop computer is joined to or disassembled with a casing in a removable way. Compared to the conventional battery module of the laptop computer, a battery module of a thin-type laptop computer is irremovable so that the volume of the thin laptop computer is reduced. However, during manufacturing and transporting, if the battery module and a lower casing are fabricated and transported separately, the battery module is transported and stored in a warehouse alone. Therefore, transport and storage costs are increased.

Otherwise, when the lower casing is formed by plastic injection molding, the structural strength of the lower casing may not conform to the strength standard of general laptop computer.

SUMMARY

A method for manufacturing a battery shell of an electronic device disclosed in an embodiment comprises providing a first metal component; providing a plastic casing; joining the first metal component to the plastic casing; providing a battery pack, the battery pack comprising a main body and a connection part; disposing the battery pack on the first metal component; and fixing the connection part on the plastic casing. The thickness of the first metal component is A, and the thickness of the plastic casing is B. The thickness of the plastic casing satisfies 0.4 millimeters (mm)$\leq B \leq$0.8 mm, and the total thickness of the first metal component and the plastic casing satisfies 0.8 mm$\leq A+B \leq$1.6 mm. The connection part is disposed on a side of the main body.

A method for manufacturing a battery shell of an electronic device disclosed in another embodiment comprises providing a first metal component; forming a plastic casing on the first metal component by insert molding; providing a battery pack, the battery pack comprising a main body and a connection part; disposing the battery pack on the first metal component; and fixing the connection part on the plastic casing. The thickness of the first metal component is A, and the thickness of the plastic casing is B. The thickness of the plastic casing satisfies 0.4 mm$\leq B \leq$0.8 mm, and the total thickness of the first metal component and the plastic casing satisfies 0.8 mm$\leq A+B \leq$1.6 mm. The connection part is disposed on a side of the main body.

A battery shell of an electronic device disclosed in yet another embodiment comprises a plastic casing having a thickness of B; a first metal component having a thickness of A and securely disposed on the plastic casing; and a battery pack disposed on the first metal component, the battery pack comprising a main body and a connection part, a side of the connection part being disposed on a side of the main body, and another side of the connection part being securely disposed on the plastic casing. The thickness of the plastic casing satisfies 0.4 mm$\leq B \leq$0.8 mm, and the total thickness of the first metal component and the plastic casing satisfies 0.8 mm$\leq A+B \leq$1.6 mm.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

A battery shell of an electronic device is disclosed according to an embodiment. By directly joining a plastic casing to a first metal component, the structure space (volume) of the electronic device is reduced, and the structural strength of the electronic device is increased.

Figure 1:
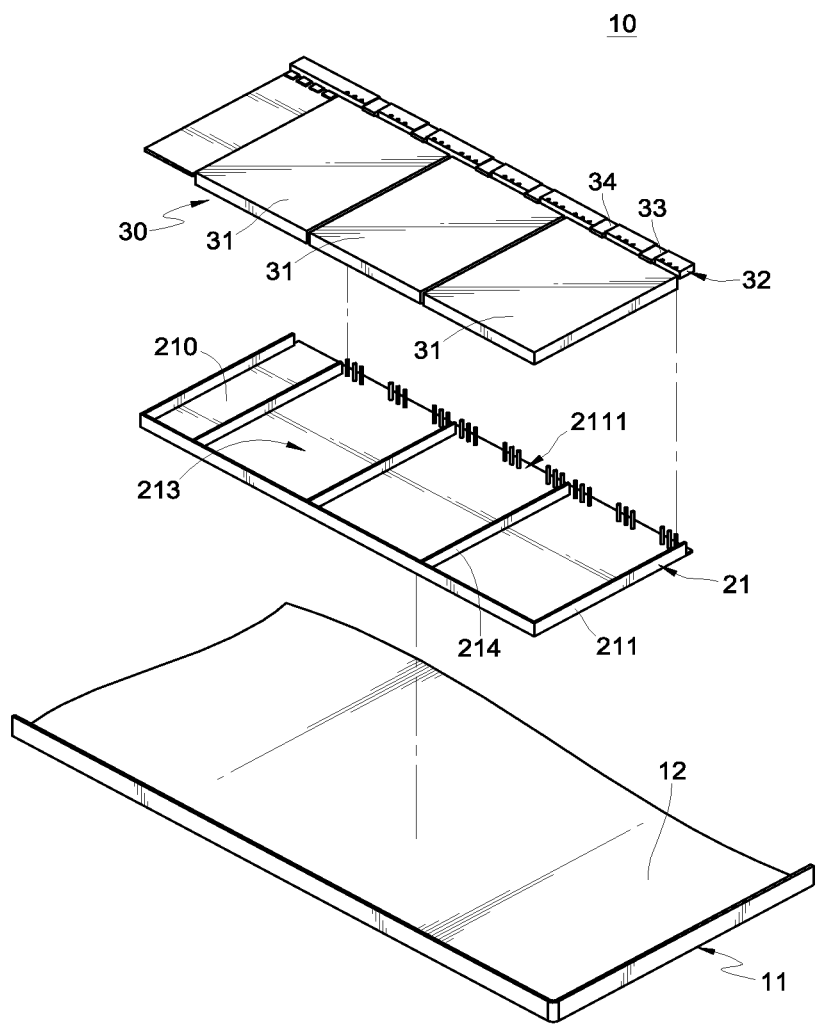
FIG. 1 is a perspective exploded view of a battery shell of an electronic device according to a first embodiment.
Figure 6:
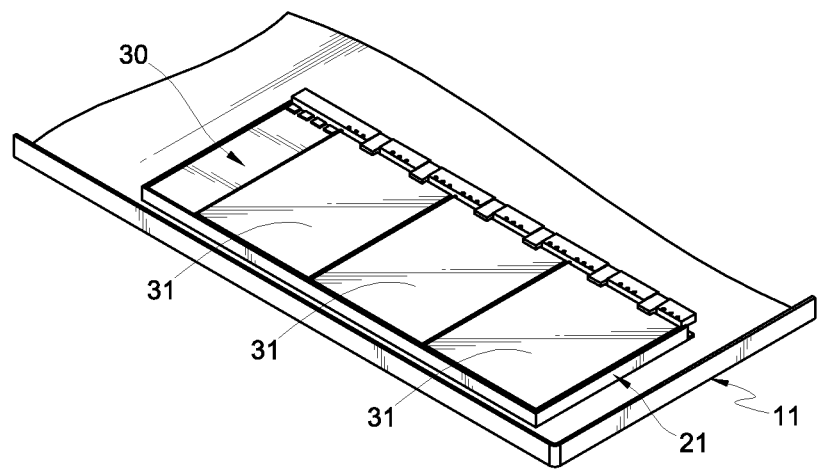
FIG. 6 is a perspective view of a first metal component, a plastic component and a battery pack according to an embodiment.

The following describes a battery shell of an electronic device disclosed in a first embodiment. Please refer to FIGS. 1 and 6. FIG. 1 is a perspective exploded view of a battery shell of an electronic device according to a first embodiment. FIG. 6 is a perspective view of a first metal component, a plastic component and a battery pack according to an embodiment.

In this embodiment, an electronic device (not shown) is a laptop computer, but not limited to the embodiment. In other embodiment, the electronic device may be a tablet computer, an electronic book or a smart phone. A battery shell 10 of the electronic device in this embodiment comprises a plastic casing 11, a first metal component 21 and a battery pack 30. The plastic casing 11 is a lower casing of the electronic device for preventing electronic components (not shown) of the electronic device form being exposed to the outside of the electronic device. The first metal component 21 is securely disposed on the plastic casing 11. The battery pack 30 is disposed on the first metal component 21. The battery pack 30 comprises three main bodies 31 and a connection part 32. The main bodies 31 are battery cells. The number of the main bodies 31 is not limited to the embodiment. A side of the connection part 32 is disposed on a side of the main bodies 31. The connection part 32 is used for connecting to each of the main bodies 31. The main bodies 31 are disposed on the inside of the first metal component 21. Moreover, a side of the connection part 32 is disposed on the outside of the first metal component 21, and another side of the connection part 32 is securely disposed on a side of the plastic casing 11. Each of the main bodies 31 comprises a first electrode 33 and a second electrode 34. The first electrode 33 and the second electrode 34 are disposed on the connection part 32. The main bodies 31 supply power to the electronic device via the first electrode 33 and the second electrode 34. In addition, the main bodies 31 (battery cells) are connected in series or in parallel by both of the first electrode 33 and the second electrode 34. The main bodies 31 may be assembled on the first metal component 21 together by a hot riveting or an adhering technology.

The first metal component 21 has a back plate 210, a sidewall 211 and three separating walls 214. The back plate 210 is joined to the plastic casing 11. The sidewall 211 is disposed on three adjacent outer edges of the back plate 210. The sidewall 211 surrounds the main bodies 31 such that the sidewall 211 and the back plate 210 form an accommodation space 213 together for accommodating the main bodies 31. The shape of the back plate 210 corresponds to that of the main bodies 31. The sidewall 211 has an opening 2111. The connection part 32 is exposed to the outside of the first metal component 21 via the opening 2111. The three separating walls 214 are disposed on the back plate 210 and separated in a distance. The three separating walls 214 are used for separating a pair of the main bodies 31 next to each other. In this embodiment, the plastic casing 11 is disposed on the first metal component 21 by adhering, but not limited to the disclosure.

In another embodiment, the plastic casing 11 is disposed on the first metal component 21 by insert molding.

Figure 2:
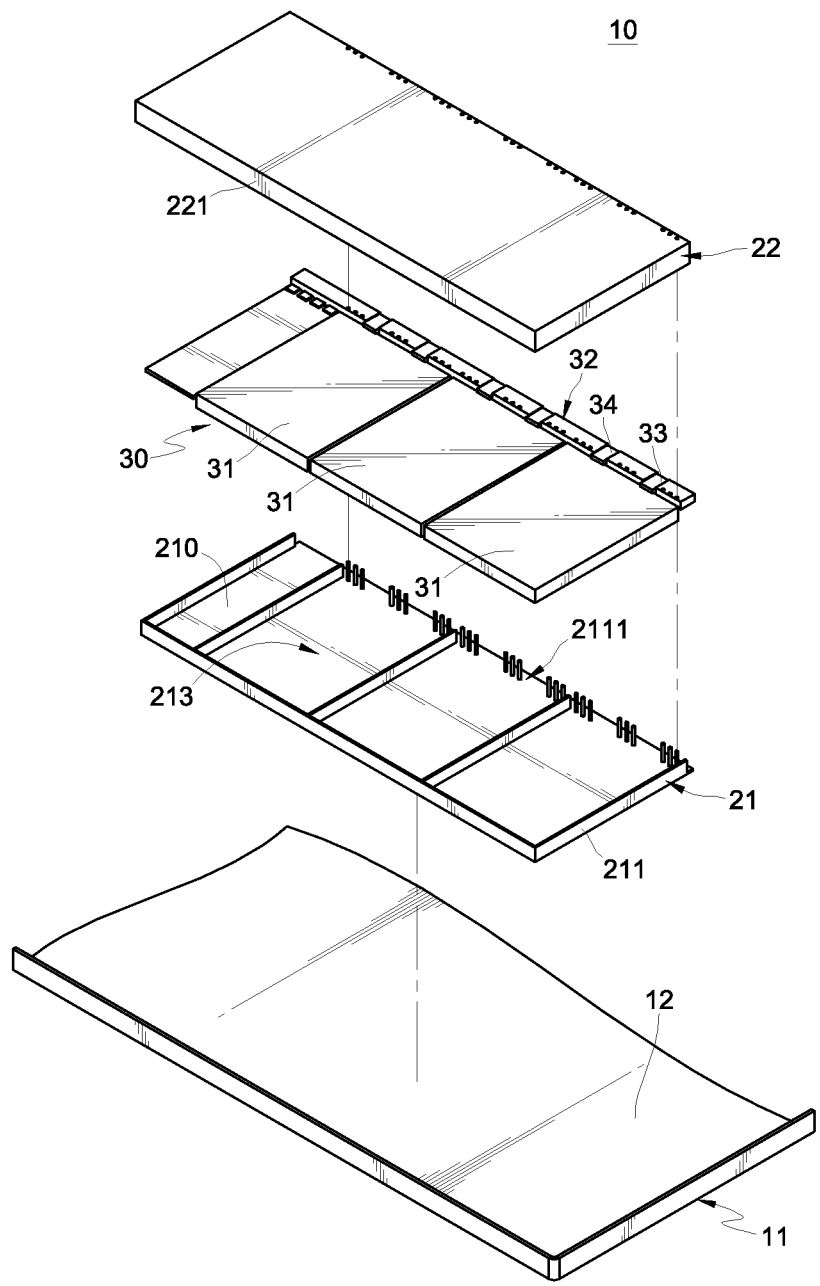
FIG. 2 is a perspective exploded view of a battery shell of an electronic device according to a second embodiment.
Figure 3:
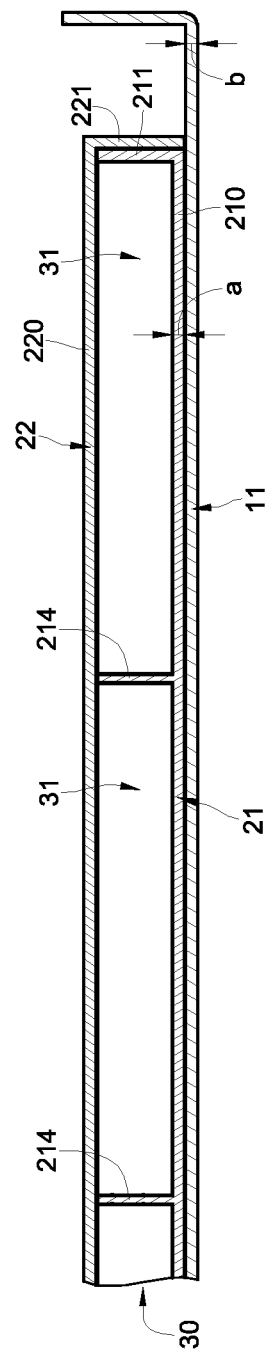
FIG. 3 is a cross-sectional view of a battery shell of an electronic device according to a second embodiment.
Figure 7:
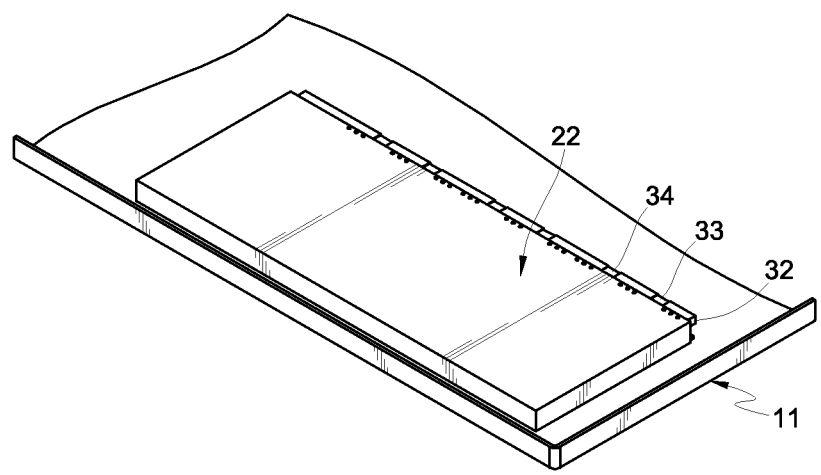
FIG. 7 is a perspective view of a battery shell of an electronic device according to an embodiment.

The following describes a battery shell of an electronic device according to a second embodiment. Please refer to FIGS. 2, 3 and 7. FIG. 2 is a perspective exploded view of a battery shell of an electronic device according to a second embodiment. FIG. 3 is a cross-sectional view of a battery shell of an electronic device according to a second embodiment. FIG. 7 is a perspective view of a battery shell of an electronic device according to an embodiment. The elements of the second embodiment are substantially the same as those in the first embodiment. The element symbols in the second embodiment correspond to those in the first embodiment with the same function or structure. Compared to the first embodiment, the battery shell 10 of the second embodiment further comprises a second metal component 22. The second metal component 22 is disposed on the first metal component 21. The first metal component 21 and the second metal component 22 cover the battery pack 30 together. Therefore, the first metal component 21 and the second metal component 22 prevent the main bodies 31 from being collided with an outside object or by an external force. The second metal component 22 has a front cover 220 and a side cover 221. The front cover 220 faces a side of the main bodies facing oppositely from the back plate 210. In other words, the front cover 220 is disposed on the one side of the main bodies, and the back plate 210 is disposed on the opposite side of the main bodies 31. The side cover 221 and the sidewall 211 are separately disposed on the same side of the main bodies 31 and the side cover 221 surrounds the sidewall 211. Moreover, the second metal component 22 may be fixed with the first metal component 21 by adhering, hot riveting or screwing.

It should be noted that the plastic casing 11 has a thickness of B and the thickness satisfies 0.4 mm≤B≤0.8 mm. The first metal component 21 has a thickness of A. When the plastic casing 11 is joined to the first metal component 21, the total thickness of the plastic casing 11 and the first metal component 21 is A+B mm, and the total thickness of the plastic casing 11 and the first metal component 21 satisfies 0.8 mm≤A+B≤1.6 mm.

According to the battery shell 10 of the electronic device disclosed in this embodiment, because the first metal component 21 is directly molded with or into the plastic casing 11, the characteristic of metal material of the first metal component 21 advances the structural strength of the plastic casing 11. By the above-mentioned combination, the structural strength and the thickness of the battery shell 10 are optimized. Therefore, miniaturization and lightweight of the electronic device are achieved.

Figure 4:
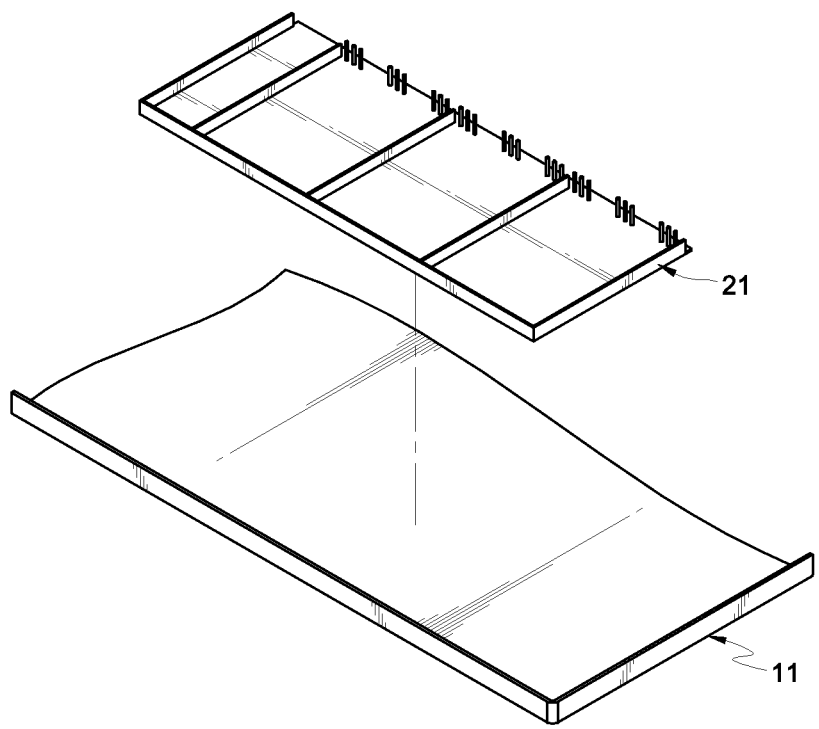
FIG. 4 is a perspective exploded view of a first metal component and a plastic component according to an embodiment.
Figure 5:
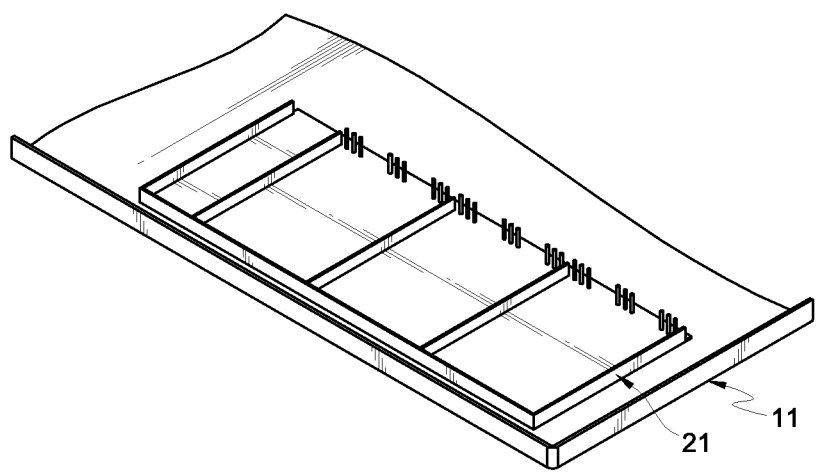
FIG. 5 is a perspective view of a first metal component and a plastic component according to an embodiment.
Figure 8:
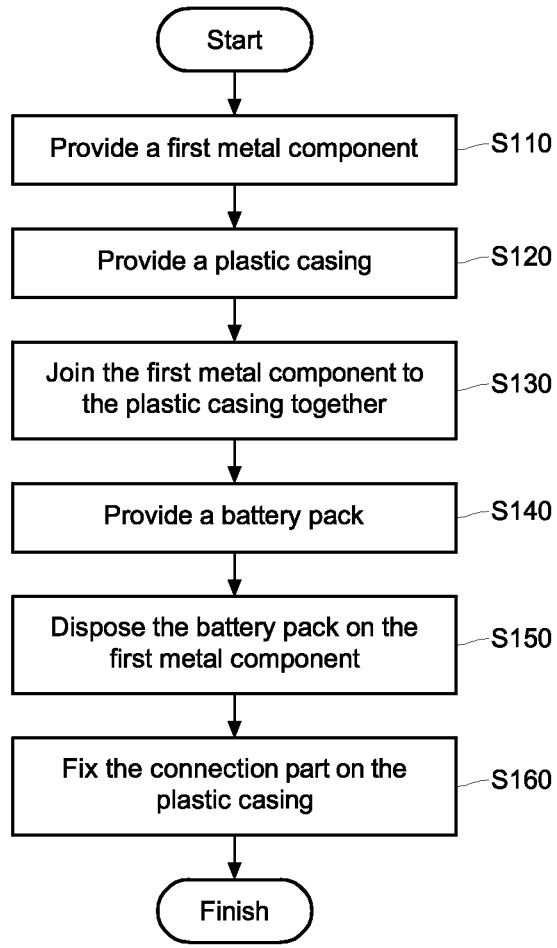
FIG. 8 is a first flow chart of manufacturing a battery shell of an electronic device according to an embodiment.

The following describes a method manufacturing a battery shell 10 of an electronic device according to an embodiment. Please refer to FIGS. 4 to 7 and 8 together. FIG. 4 is a perspective exploded view of a first metal component and a plastic component according to an embodiment. FIG. 5 is a perspective view of a first metal component, a plastic component and a battery pack according to an embodiment. FIG. 8 is a first flow chart of manufacturing a battery shell of an electronic device according to an embodiment.

Please refer to FIG. 4. First, a first metal component 21 is provided (Step 110). The first metal component 21 has a thickness of A. After that, a plastic casing 11 is provided (Step 120). The plastic casing 11 has a thickness of B, and the thickness of the plastic casing 11 satisfies 0.4 mm≤B≤0.8 mm. Please refer to FIG. 5. Then, the first metal component 21 is joined to the plastic casing 11 (Step 130). In this embodiment, the above-mentioned combination is to join the first metal component 21 to the plastic casing 11 by adhering. It should be noted that the total thickness of the first metal component 21 and the plastic casing 11 is A+B, and the thickness satisfies 0.8 mm≤A+B≤1.6 mm. The first metal component 21 has a back plate 210, a sidewall 211 and three separating walls 214. The back plate 210 is joined to the plastic casing 11. The sidewall 211 is disposed on three adjacent outer edges of the back plate 210. The sidewall 211 surrounds the main bodies 31 such that the sidewall 211 and the back plate 210 form an accommodation space 213 together for accommodating the main bodies 31. The shape of the back plate 210 corresponds to that of the main bodies 31. The sidewall 211 has an opening 2111. The connection part 32 is exposed to the outside of the first metal component 21 via the opening 2111.

As shown in FIG. 6, a battery pack 30 is provided (Step 140). The battery pack 30 comprises three main bodies 31 and a connection part 32. A side of the connection part 32 is disposed on a side of the main bodies 31. The battery pack 30 is disposed on the first metal component 21 (Step 150). The main bodies 31 of the battery pack 30 are disposed in the accommodation space 213 and also disposed on the first metal component 21 by adhering or hot riveting. After that, the connection part 32 is fixed on the plastic casing 11 (Step 160). The fixing way of the connection part 32 may be adjusted according to actual requirement. Such method for manufacturing the battery shell 10 of the electronic device in this embodiment is complete.

Figure 9:
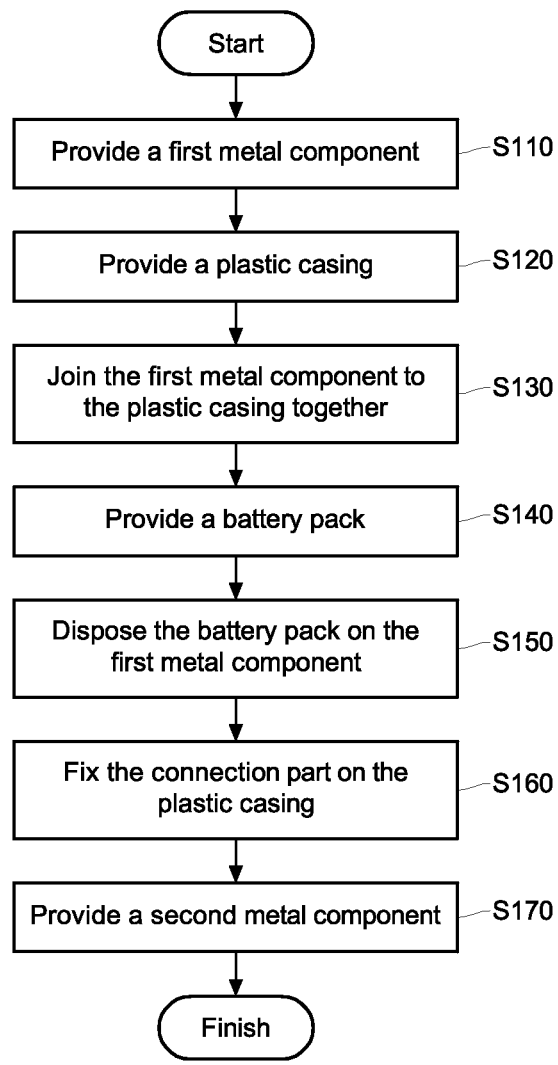
FIG. 9 is a second flow chart of manufacturing a battery shell of an electronic device according to an embodiment.

Please refer to FIGS. 7 and 9 together. FIG. 9 is a second flow chart of manufacturing a battery shell of an electronic device according to an embodiment. In another embodiment, after the Step 160 is finished, a second metal component 22 may further be provided. The second metal component 22 is disposed on the first metal component 21. The first metal component 21 and the second metal component 22 cover the main bodies 31 (Step 170). The second metal component 22 may be fixed with the first metal component 21 by adhering, hot riveting or screwing. Such method for manufacturing the battery shell 10 of the electronic device according to this embodiment is complete.

Figure 10:
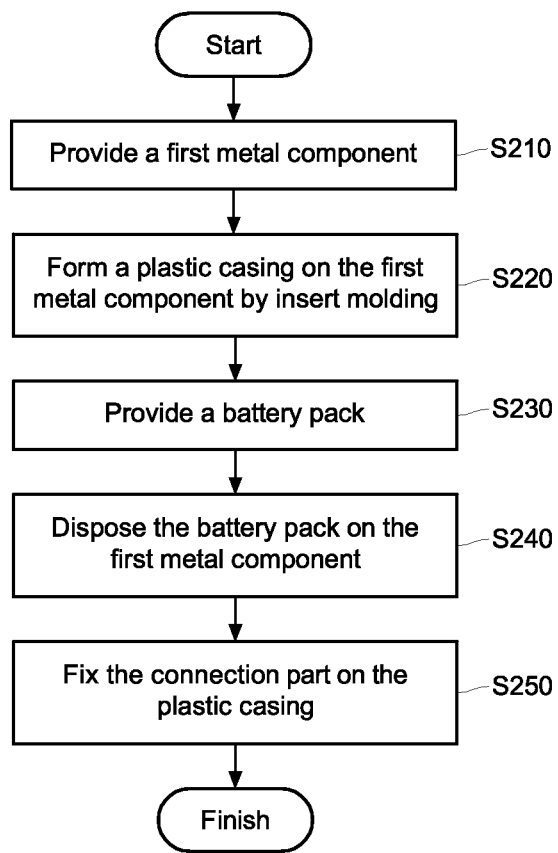
FIG. 10 is a third flow chart of manufacturing a battery shell of an electronic device according to an embodiment.

The following describes a method for manufacturing a battery shell 10 of an electronic device according to other embodiment. Please refer to FIGS. 4 to 6 and 10 together. FIG. 10 is a third flow chart of manufacturing a battery shell of an electronic device according to an embodiment. Please refer to FIGS. 4 and 5. First, a first metal component 21 is provided (S210). The first metal component 21 has a thickness of A.

After that, a plastic casing 11 is formed on the first metal component 21 by insert molding (Step 220). The plastic casing 11 has a thickness of B. Therefore, the first metal component 21 is directly molded with or into the plastic casing 11. The thickness of the plastic casing 11 satisfies 0.4 mm≤B≤0.8 mm.

As shown in FIG. 6, a battery pack 30 is provided (Step 230). The battery pack 30 comprises three main bodies 31 and a connection part 32. A side of the connection part 32 is disposed on a side of the main bodies 31. The battery pack 30 is disposed on the first metal component 21 (Step 240). Afterwards, the connection part 32 is fixed on the plastic casing 11 (S250). It should be noted that the total thickness of the plastic casing 11 and the first metal component 21 is A+B, and the thickness satisfies 0.8 mm≤A+B≤1.6 mm. Therefore, such method for manufacturing the battery shell 10 of the electronic device in this embodiment is complete.

Figure 11:
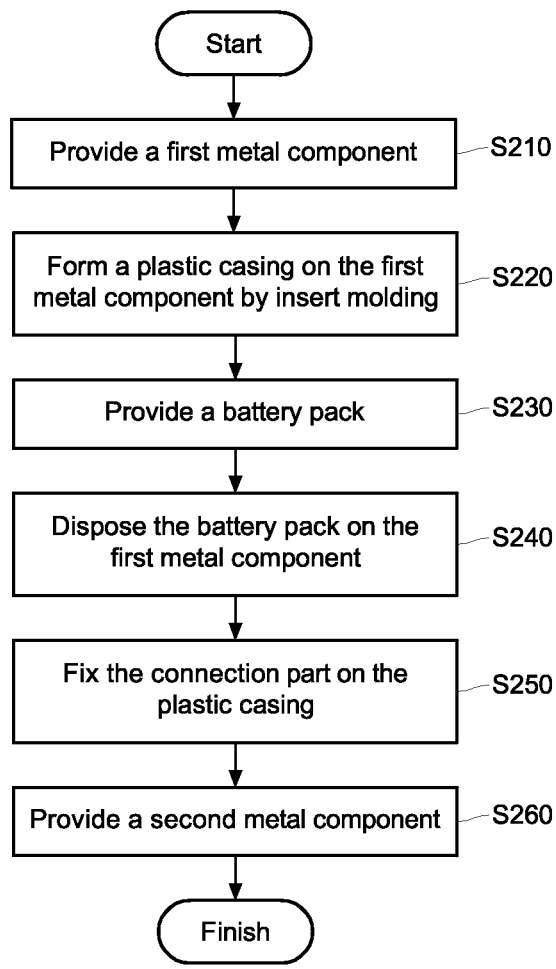
FIG. 11 is a fourth flow chart of manufacturing a battery shell of an electronic device according to an embodiment.

Please continue to refer to FIGS. 7 and 11 together. FIG. 11 is a fourth flow chart of manufacturing a battery shell of an electronic device according to an embodiment. In other embodiment, after the Step 250 is finished, a second metal component 22 may further be provided (Step 260). The second metal component 22 is disposed on the first metal component 21. The first metal component 21 and the second metal component 22 cover the main bodies 31. Such method for manufacturing the battery shell 10 of the electronic device according to this embodiment is complete. Moreover, the second metal component 22 may be fixed with the first metal component 21 by adhering, hot riveting or screwing.

To sum up, the battery shell of the electronic device according to the embodiment discloses that the first metal component is joined to the plastic casing to each other by the above-mentioned combination way. The total thickness of the plastic casing and the first metal component is A+B, and the thickness satisfies 0.8 mm≤A+B≤1.6 mm. Such direct co-construction way solves the problem that when the conventional laptop computer is thinner, the structural strength of the conventional laptop computer is lower. Besides, the battery shell of the electronic device and manufacturing method thereof may save the transport, assembly and storage costs. Last but not least, miniaturization and lightweight of the electronic device are achieved.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A method for manufacturing a battery shell of an electronic device, comprising:
   providing a first metal component;
   providing a plastic casing, wherein said plastic casing is a portion of an exterior shell of the electronic device;
   joining said first metal component to said plastic casing;
   providing a battery pack, said battery pack comprising a main body and a connection part, wherein said main body comprises a plurality of battery cells, and said connection part connects to each of the battery cells;
   disposing said battery pack on said first metal component, such that said first metal component is sandwiched between said plastic casing and said battery pack; and
   fixing said connection part on said plastic casing;
   wherein the thickness of said first metal component is A, the thickness of said plastic casing is B, the thickness of said plastic casing satisfies 0.4 millimeters (mm)≤B≤0.8 mm, the total thickness of said first metal component and said plastic casing satisfies 0.8 mm≤A+B≤1.6 mm, and said connection part is disposed on a side of said main body.

2. The method according to claim 1, further comprising:
   providing a second metal component disposed on said first metal component, said first metal component and said second metal component covering said battery pack.

3. The method according to claim 1, wherein said first metal component has a back plate and a sidewall surrounding said main body, said back plate is joined to said plastic casing together, said sidewall is disposed on an outer edge of said back plate, and said sidewall and said back plate form an accommodation space for accommodating said main body.

4. The method according to claim 3, wherein said sidewall has an opening, and said connection part extends past said back plate so as to partially directly overlap with said plastic casing and is exposed to the outside of said first metal component via said opening.

5. The method according to claim 3, wherein the shape of said back plate corresponds to the shape of said main body.

6. The method according to claim 1, wherein said first metal component is joined to said plastic casing by adhering.

7. A method for manufacturing a battery shell of an electronic device, comprising:
   providing a first metal component;
   forming a plastic casing on said first metal component by insert molding, wherein said plastic casing is a portion of an exterior shell of the electronic device;
   providing a battery pack, said battery pack comprising a main body and a connection part, wherein said main body comprises a plurality of battery cells, and said connection part connects to each of the battery cells;
   disposing said battery pack on said first metal component, such that said first metal component is sandwiched between said plastic casing and said battery pack; and
   fixing said connection part on said plastic casing;
   wherein the thickness of said first metal component is A, the thickness of said plastic casing is B, the thickness of said plastic casing satisfies 0.4 mm≤B≤0.8 mm, the total thickness of said first metal component and said plastic casing satisfies 0.8 mm≤A+B≤1.6 mm, and said connection part is disposed on a side of said main body.

8. The method according to claim 7, further comprising:
providing a second metal component disposed on said first metal component, and said first metal component and said second metal component covering said battery pack.

9. The method according to claim 7, wherein said first metal component has a back plate and a sidewall surrounding said main body, said back plate is joined to said plastic casing together, said sidewall is disposed on an outer edge of said back plate, and said sidewall and said back plate form an accommodation space for accommodating said main body.

10. The method according to claim 9, wherein said sidewall has an opening, and said connection part extends past said back plate so as to partially directly overlap with said plastic casing and is exposed to the outside of said first metal component via said opening.

11. The method according to claim 9, wherein the shape of said back plate corresponds to the shape of said main body.

12. A battery shell of an electronic device, comprising:
a plastic casing having a thickness of B, wherein said plastic casing is a portion of an exterior shell of the electronic device;
a first metal component having a thickness of A and disposed securely on said plastic casing; and
a battery pack disposed on said first metal component, said battery pack comprising a main body and a connection part, wherein said main body comprises a plurality of battery cells, and said connection part connects to each of the battery cells, arranged such that a side of said connection part is disposed on a side of said main body, and another side of said connection part is fixed on said plastic casing;
wherein said first metal component is sandwiched between said plastic casing and said battery pack
wherein the thickness of said plastic casing satisfies $0.4 \text{ mm} \leq B \leq 0.8 \text{ mm}$, the thickness of said first metal component and said plastic casing satisfies $0.8 \text{ mm} \leq A+B \leq 1.6 \text{ mm}$.

13. The battery shell of the electronic device according to claim 12, further comprising:
a second metal component disposed on said first metal component, such that said first metal component and said second metal component cover said battery pack together.

14. The battery shell of the electronic device according to claim 12, wherein said first metal component has a back plate and a sidewall surrounding said main body, said back plate is joined to said plastic casing together, said sidewall is disposed on an outer edge of said back plate, and said sidewall and said back plate form an accommodation space for accommodating said main body.

15. The battery shell of the electronic device according to claim 14, wherein the shape of said back plate corresponds to the shape of said main body.

16. The battery shell of the electronic device according to claim 14, wherein said sidewall has an opening, and said connection part extends past said back plate so as to partially directly overlap with said plastic casing and is exposed to the outside of said first metal component via said opening.

17. The battery shell of the electronic device according to claim 12, wherein said plastic casing is formed on said first metal component by insert molding.

18. The battery shell of the electronic device according to claim 12, wherein said plastic casing is formed on said first metal component by adhering.

* * * * *